United States Patent [19]

Vaahs et al.

[11] Patent Number: 5,182,411
[45] Date of Patent: Jan. 26, 1993

[54] POLYMERIC CHLOROSILAZANES, PROCESS FOR THEIR PREPARATION, CERAMIC MATERIALS CONTAINING SILICON NITRIDE WHICH CAN BE MANUFACTURED THEREFROM, AND THEIR MANUFACTURE

[75] Inventors: Tilo Vaahs, Kelkheim; Marcellus Peuckert; Martin Brück, both of Hofheim am Taunus, all of Fed. Rep. of Germany

[73] Assignee: Hoechst Aktiengesellschaft, Frankfurt am Main, Fed. Rep. of Germany

[21] Appl. No.: 444,681

[22] Filed: Nov. 30, 1989

[30] Foreign Application Priority Data

Dec. 3, 1988 [DE] Fed. Rep. of Germany ....... 3840775

[51] Int. Cl.$^5$ .................................................. C07F 7/10
[52] U.S. Cl. ...................................... 556/409; 528/33; 528/34; 528/37
[58] Field of Search ...................... 556/409; 528/33, 34, 528/37

[56] References Cited

U.S. PATENT DOCUMENTS

| | | | |
|---|---|---|---|
| 3,355,475 | 11/1967 | Baney | 556/409 |
| 4,397,828 | 8/1983 | Seyferth et al. | 423/344 |
| 4,482,669 | 11/1984 | Seyferth et al. | 524/442 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,659,850 | 4/1987 | Arai et al. | 556/409 |
| 4,742,143 | 5/1988 | Haluska | 528/37 |
| 4,847,345 | 7/1989 | Takamizawa et al. | 528/35 |
| 4,869,854 | 9/1989 | Takeda et al. | 264/22 |
| 4,931,513 | 6/1990 | Gerdau et al. | 525/474 |
| 4,952,715 | 8/1990 | Blum et al. | 556/409 |

FOREIGN PATENT DOCUMENTS 2611208 8/1988 France.

OTHER PUBLICATIONS

Andrianov, K. A. et al., *Consultants Bureau:* 1822–1824 (1973) (Engl. transl. of *Izv. Akad. Nauk SSSR,* Ser. Khim. 1973(8), 1878).
Wills, R. R. et al, *Ceramic Bulletin* 62:904–915 (1983).

*Primary Examiner*—Paul F. Shaver
*Attorney, Agent, or Firm*—Connolly & Hutz

[57] ABSTRACT

The invention relates to novel polymeric chlorosilazanes, to their preparation, to their processing to form ceramic material containing silicon nitride, and to said material itself. The polymeric chlorosilazanes are prepared by reacting a mixture of oligosilazanes of formula (I)

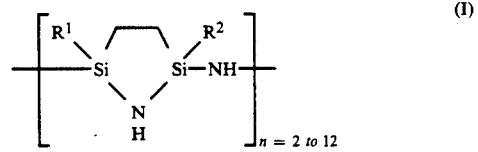

in which n is about 2 to about 12, and oligosilazanes of formula (II), $(RSiHNH)_m$, in which m is about 3 to about 12, with at least one of the chlorosilanes $Cl_2R^2Si-CH_2-CH_2-SiR^2Cl_2$, $Cl_3Si-CH_2-CH_2-SiR^3Cl_2$, $R^4SiCl_3$ or $R^5SiHCl_2$ at 30° C. to 300° C., where R and $R^1$ to $R^5$ are $C_1-C_6$ alkyl or $C_2-C_6$ alkenyl groups which can be identical or different.

The polymeric chlorosilazanes according to the invention can be converted into polysilazanes by reaction with ammonia, and these in turn can be pyrolyzed to form ceramic materials containing silicon nitride.

9 Claims, No Drawings

POLYMERIC CHLOROSILAZANES, PROCESS FOR THEIR PREPARATION, CERAMIC MATERIALS CONTAINING SILICON NITRIDE WHICH CAN BE MANUFACTURED THEREFROM, AND THEIR MANUFACTURE

DESCRIPTION

Polymers chlorosilazanes, process for their preparation, ceramic materials containing silicon nitride which can be manufactured therefrom, and their manufacture.

The invention relates to novel polymeric chlorosilazanes, to their preparation, to their processing to form ceramic material containing silicon nitride, and to said material itself.

The pyrolysis of polysilazanes to form ceramic material containing silicon nitride has already been described in the literature (R. R. Wills et al., Ceramic Bulletin, vol. 62 (1983), 904–915).

Polysilazanes are normally prepared using chlorosilanes as starting materials, which are reacted with ammonia or primary or secondary amines (U.S. Pat. Nos. 4,540,803, 4,543,344, 4,595,775, 4,397,828, 4,482,669).

The present invention provides novel starting materials for polysilazanes, i.e. polymeric chlorosilazanes.

The present invention relates to a process for the preparation of polymeric chlorosilazanes which comprises reacting a mixture of oligosilazanes of general formula (I)

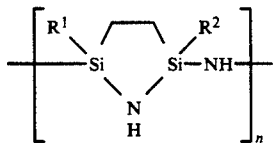

in which n is about 2 to about 12, and oligosilazanes of formula (II), $(RSiHNH)_m$, in which m is about 3 to about 12, with at least one of the chlorosilanes $Cl_2R^2Si-CH_2-CH_2-SiR^2Cl_2$, $Cl_3Si-CH_2-CH_2-SiR^3Cl_2$, $R^4SiCl_3$ or $R^5SiHCl_2$ at 30° C. to 300° C., where R and $R^1$ to $R^5$ are $C_1-C_6$ alkyl or $C_2-C_6$ alkenyl groups which can be identical or different. They preferably have 1 to 3 carbon atoms. It is especially preferred if $R=R^1=R^2=R^3=R^5=CH_3$ and $R^4=CH_3$ or vinyl.

The oligosilazanes of formula (I) used as starting materials can be obtained by reacting a 1,2-bis(organodichlorosilyl)ethane of the formula

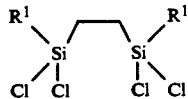

where $R^1$ is as defined above, with excess $NH_3$ in a solvent, in a manner analogous to that described for methyldichlorosilane in U.S. Pat. No. 4,482,669 (see especially columns 4, 5, 7, 8 in said document). This reaction generally yields a mixture of linear and cyclic oligomers with different chain lengths n. The preparation of the simplest homolog where $R^1=CH_3$ is already known from K. A. Andrianov et al., Izvestiya Akademii Nauk SSSR, Seriya Khimicheskaya no. 8, pp. 1878–1880 (1973).

The oligosilazanes of formula (II) also used as starting materials can be obtained by reacting a dichlorohydridoalkylsilane of the formula $RSiHCl_2$, where R is as defined above, with excess $NH_3$ in a solvent, as described in U.S. Pat. No. 4,482,669 (see especially columns 4, 5, 7, 8 in said document). This reaction generally yields a mixture of linear and cyclic oligomers with different chain lengths n. The oligomers of formulae (I) and (II) can be mixed in any proportions in the process according to the invention; the molar ratio should generally be 1:100 to 100:1.

In the reaction giving the polymeric chlorosilazane, the molar ratio of the reactants, namely chlorosilane: monomer units of the oligosilazanes (n=1), is preferably about 0.1:1 to about 1:1, in particular about 0.1:1 to about 0.4:1.

The reactants are preferably reacted with one another by taking the oligosilazanes of formulae (I) and (II) and adding at least one of said chlorosilanes thereto. As the reaction is exothermic, the temperature is preferably kept initially at 30° to 50° C. when the reactants are brought together. The reaction mixture is then heated to temperatures of 100° to 300° C., preferably 120° to 250° C.

Some of the $NH_3$ formed as a by-product escapes during the reaction. When the reaction is complete, the remainder is removed from the reaction vessel, generally by the application of a vacuum.

Most of the $NH_4Cl$ which is also formed in the reaction sublimes out of the reaction mixture in the course of the reaction. Any residual $NH_4Cl$ can be separated from the polymeric chlorosilazane prepared according to the invention by extraction with an inert organic solvent such as n-hexane, toluene or ether.

The reaction time depends on the heating rate and the reaction temperature. A reaction time of 3 to 7 hours is generally sufficient.

The reaction can also be carried out in an organic solvent. Suitable solvents are those which exhibit inert behavior towards the reactants and have a sufficiently high boiling point, e.g. saturated aliphatic or aromatic hydrocarbons such as n-decane, decalin, xylene or toluene, chlorinated hydrocarbons such as chlorobenzene, or ethers such as dibenzyl ether or diethylene glycol diethyl ether. When using a solvent in which the $NH_4Cl$ formed is insoluble, the latter can be separated off by filtration. The polymeric chlorosilazanes according to the invention are then obtained by distillation of the solvent under reduced pressure.

If appropriate, the process can also be carried out under reduced pressure or at pressures in the range from 1 to 10 atmospheres.

The process can also be carried out continuously.

The novel polymeric chlorosilazanes prepared have a molecular sructure which can be represented by formula (III)

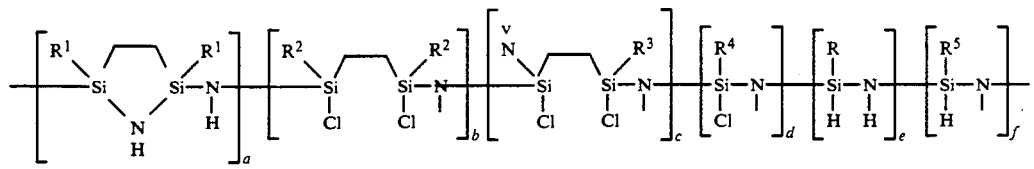

where the free valencies on the nitrogen atoms are saturated with H atoms or silyl radicals R*SiXN< (X=H, Cl, N<, CH$_2$CH$_2$Si≡). R, R$^1$ to R$^5$ and R* are C$_1$-C$_6$ alkyl or C$_2$-C$_6$ alkenyl groups, preferably having 1 to 3 carbon atoms, and a, b, c, d, e and f are the mol fractions of the respective structural units, where $a+b+c+d+e+f=1$. It is especially preferred if R=R$^1$=R$^2$=R$^3$=R$^5$=R*=CH$_3$ and R$^4$=CH$_3$ or vinyl.

The polymeric chlorosilazanes have a lattice structure. Whether the mol fractions b, c, d and f take positive values or the value 0 depends on the chlorosilanes used in the reaction with the oligosilazanes of formulae (I) and (II).

If the mixture of (I) and (II) is reacted only with R$^4$SiCl$_3$, b=c=f=0; a, d and e take positive values.

If the mixture of (I) and (II) is reacted only with R$^5$HSiCl$_2$, b=c=0; a, d, e and f take positive values.

If the mixture of (I) and (II) is reacted only with Cl$_2$R$^2$Si—CH$_2$CH$_2$—SiR$^2$Cl$_2$, c=d=f=0; a, b and e take positive values.

Accordingly, the present invention further relates to polymeric chlorosilazanes of formula (III)

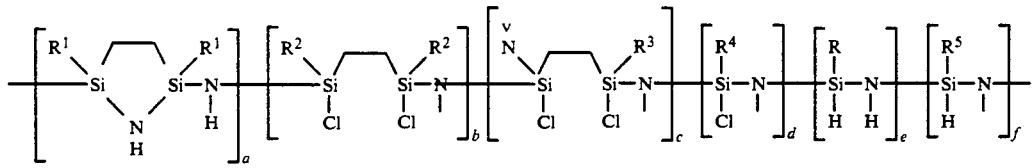

where the free valencies on the nitrogen atoms are saturated with H atoms or silyl radicals R*SiXN< (X=H, Cl, N<, CH$_2$CH$_2$Si≡)and where R, R$^1$ to R$^5$ and R* are C$_1$-C$_6$ alkyl or C$_2$-C$_6$ alkenyl groups and a, b, c, d, e and f are the mol fractions of the respective structural units. a, b, c, d, e and f add up to a value of one.

Individual indices can also take the value zero, as explained in greater detail above. The actual values of a, b, c, d, e and f can be determined by integration of the $^1$H NMR spectra and by means of elemental analysis.

In general, the sum of a and e is 0.1 to 0.8 and b, c, d and f are generally 0.01 to 0.4, where $a+b+c+d+e=1$.

Preferred polymeric chlorosilazanes are those in which the sum of a and e is 0.7 to 0.9, in particular 0.75 to, when greater than zero, 0.85. The preferred values of b, c, d and f are 0.01 to 0.3, in particular 0.01 to 0.2. These values can be checked via said analytical methods. The preferred values of a, b, c, d, e and f which have just been mentioned have proved particularly satisfactory in cases where a fiber is to be manufactured as the end product of pyrolysis (after conversion of the polymeric chlorosilazanes into polysilazanes).

The present invention further relates to polymeric chlorosilazanes which can be obtained by reacting a mixture of oligosilazanes of general formula (I)

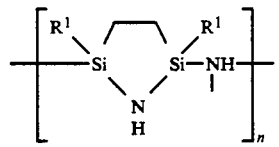

in which n is about 2 to about 12, and oligosilazanes of formula (II), (RSiHNH)$_m$, in which m is about 3 to about 12, with at least one of the chlorosilanes Cl$_2$R$^2$Si—CH$_2$—CH$_2$—SiR$^2$Cl$_2$, Cl$_3$Si—CH$_2$—CH$_2$—SiR$^3$Cl$_2$, R$^4$SiCl$_3$ or R$^5$SiHCl$_2$ at 30° C. to 300° C., where R and R$^1$ to R$^5$ are C$_1$-C$_6$ alkyl or C$_2$-C$_6$ alkenyl groups which can be identical or different. They preferably have 1 to 3 carbon atoms. It is especially preferred if R=R$^1$=R$^2$=R$^3$=R$^5$=CH$_3$ and R$^4$=CH$_3$ or vinyl.

The novel polymeric chlorosilazanes can be converted into polysilazanes by reaction with ammonia ("ammonolysis"), and these in turn can be converted by pyrolysis into ceramic material containing silicon nitride.

The ammonolysis can be carried out in liquid NH$_3$, although it is advantageous to carry it out in an organic solvent. Suitable solvents are all those which exhibit inert behavior towards the polymeric chlorosilazanes. Preferred solvents are those in which the ammonium chloride obtained as a by-product has a low solubility and from which it can easily be separated off, e.g. ethers, aliphatic and aromatic hydrocarbons and chlorinated hydrocarbons. In the ammonolysis, the reactants can be fed into the reaction vessel in any order, but it is normally advantageous to take the polymeric chloro silane in solution and pass in gaseous ammonia or add liquid ammonia. If the polymeric chlorosilazanes according to the invention has been prepared in a suitable organic solvent, the ammonolysis can be carried out in this solvent without prior separation of the NH$_4$Cl. The ammonolysis is preferably carried out with an excess of NH$_3$ in order to ensure that the reaction is complete and the end products are as free from chlorine as possible. Twice the stoichiometric amount is generally sufficient for this purpose.

The reaction is generally carried out at a temperature of about −50° to +100° C., preferably at −20° to +30° C. and in particular at room temperature (in which case ice cooling is used). It is also possible, however, to carry out the reaction above room temperature, e.g. at the boiling point of the solvent used, or below room temperature, e.g. at −33° C. when using liquid NH$_3$.

When the ammonolysis is complete, any excess NH$_3$ is removed and the ammonium chloride obtained is filtered off. The yield can be increased by washing the precipitate with one of the above-mentioned organic solvents. After distillation of the solvent under reduced pressure, the polysilazanes are obtained immediately as white powders. The polysilazanes are soluble in the above organic solvents, so they can be used either to coat surfaces or to manufacture fibers.

The polysilazanes can be pyrolyzed in an inert nitrogen or argon atmosphere, at temperatures of 800° to 1200° C., to form dense, amorphous materials which consist essentially of Si, N and C and can also contain traces of H and O. At pyrolysis temperatures above 1200° C., for instance in the range from 1200° C. to 1400° C., partially amorphous, microcrystalline ceramic materials are formed which contain α-Si$_3$N$_4$ as a crystalline phase.

A particular advantage is that, before pyrolysis, the polysilazanes can be shaped by various processes to form three-dimensional shaped articles.

One important method of shaping is fiber drawing, where fibers can be drawn out of high-viscosity solutions of the polysilazane in solvents such as toluene, THF or hexane. The fibers are advantageously drawn by means of spinnerets with a diameter of 80 to 150 μm. Subsequent stretching makes the filament thinner, whereby a very strong filament with a diameter of 2 to 20 μm, in particular 5 to 15 μm, is formed after pyrolysis. The fibers manufactured by subsequent pyrolysis are used as mechanical reinforcing matrices in fiber-reinforced aluminum, aluminum alloys and ceramic components.

Another important method by which the polysilazanes can be processed is the manufacture of dense, strongly adhesive, amorphous or microcrystalline ceramic coatings on metals, in particular steel. The coatings are applied with the aid of a solution of the polysilazane in organic solvents such as toluene, THF or hexane. Pyrolytic conversion into an amorphous or microcrystalline layer takes place in the same temperature range of 800° to 1200° C. or 1200° to 1400° C., under an inert gas, in the manner described above for three-dimensional shaped articles.

On account of their outstanding adhesion, high hardness and surface quality, the ceramic coatings are particularly suitable for improving the surface of mechanically and chemically stressed machine components.

The polysilazanes described above can also be pyrolyzed in an NH$_3$ atmosphere rather than in an inert gas, with an equally high ceramic yield of 70 to 90%. This results in a practically carbon-free, transparent, colorless material. When pyrolysis is carried out in NH$_3$ at 1000° C. or above, the carbon content is less than 0.5% by weight. Depending on the pyrolysis temperature, the pyrolysis product consists of practically pure, amorphous silicon nitride (pyrolysis below 1200° C.) or crystalline Si$_3$N$_4$ (pyrolysis above 1200° C., in particular above 1300° C.). Pyrolysis in NH$_3$ can be applied to all the shaped articles manufactured by the shaping processes described above, i.e. articles shaped from powders, fibers and coatings.

Thus the invention further relates to a process for the manufacture of ceramic material containing silicon nitride, wherein the above-mentioned polymeric chlorosilazanes, characterized by their formula or the process for their preparation, are reacted with ammonia at −50° to +100° C. and the polysilazane formed is pyrolyzed in an inert nitrogen or argon atmosphere or in an ammonia atmosphere at 800° to 1400° C.

Preferably, however, the conversion of the polymeric chlorosilazanes into ceramic material containing silicon nitride is carried out in such a way that the polysilazanes formed as intermediates are not isolated. In this case, the polymeric chlorosilazanes are preferably reacted with gaseous ammonia and the reaction mixture formed is pyrolyzed in an ammonia atmosphere.

Accordingly, the present invention further relates to a process for the manufacture of ceramic material containing silicon nitride, wherein the above-mentioned polymeric chlorosilazanes, characterized by their formula or the process for their preparation, are reacted with ammonia at 0° to +300° C. and the reaction product is pyrolyzed in an NH$_3$ atmosphere at 800°-1400° C.

In this case, i.e. where the polysilazane formed as an intermediate is not isolated, the shaping process must of course take place at the polymeric chlorosilazane stage, i.e. fibers, coatings or shaped articles are manufactured from these polymeric chlorosilazanes and then reacted with NH$_3$ and pyrolyzed.

Experimental report

1. Preparation of 1,2-bis(methyldichlorosilyl)ethane of the formula

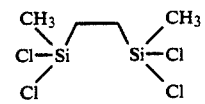

By means of hydrosilylation, two molecules of methyldichlorosilane, (CH$_3$)HSiCl$_2$, were added on to one molecule of ethyne, HCCH. This was done by taking toluene as a solvent and passing gaseous ethyne into it. 0.5 ml of a 0.05 molar solution of hexachloroplatinic acid in chloroform was added to this solution. The mixture was heated to 100° C. and methyldichlorosilane (b.p. 45° C.) was slowly added dropwise, ethyne being passed in continuously. The course of the reaction was followed via the temperature of the reaction mixture. If this dropped below 80° C., there was too much unreacted methyldichlorosilane, which was then left to react before any more was added. The yield of 1,2-bis(methyldichlorosilyl)ethane was almost 100% and the solution could be used to prepare the oligosilazane without being worked up. The chlorosilane content could easily be determined with the aid of the $^1$H NMR spectrum.

It is preferred to use the smallest possible proportions of solvent. The compound could be prepared in a completely solvent-free process by taking 1,2-bis(methyldichlorosilyl)ethane at the outset in order to reach the necessary reaction temperature.

2. Preparation of the oligosilazane of formula (I) where R$^1$=CH$_3$:

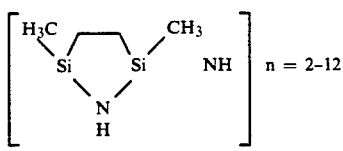 n = 2-12

150 ml (181 g; 0.71 mol) of Cl₂(CH₃)SiCH₂CH₂Si(CH₃)Cl₂ were dissolved in 1400 ml of absolute THF, and ammonia was then passed in for 3 hours (flow rate: 0.5 l/min). The temperature was kept in the range from 0° C. to 15° C. by cooling with an ice bath. The reaction was brought to completion by stirring for one hour at room temperature and the ammonium chloride was then separated off under N₂. The precipitate was washed with twice 200 ml of dry THF and the combined filtrates were concentrated under reduced pressure to give the oligosilazane in the form of a clear, readily mobile oil with a yield of 82 g (80% of theory).

3. Preparation of the oligohydridomethylsilazane of formula (II) where R=CH₃: (CH₃SiHNH)ₙ

100 ml (0.97 mol) of methyldichlorosilane were dissolved in 800 ml of absolute THF, and ammonia was passed in for 3 hours (flow rate: 0.5 l/min). The reaction temperature was kept in the range from 20° to 25° C. by cooling with an ice bath. The reaction was brought to completion by stirring for 1 h at room temperature and the ammonium chloride was then separated off under argon. The precipitate was washed with twice 350 ml of THF and the combined THF solutions were concentrated under reduced pressure to give a clear, readily mobile oil of (CH₃SiHNH)ₙ with a yield of 44.5 g=78% of theory.

EXAMPLE

The oligosilazanes of formula (I) where R¹=CH₃ (114 g; 0.79 mol) and of formula (II) where R=CH₃ (90 g; 1.52 mol) were mixed and introduced into a 1 l round-bottomed flask fitted with a reflux condenser and an associated cold trap. 204 ml (227.5 g; 1.98 mol) of methyldichlorosilane, CH₃SiHCl₂, were added dropwise, with stirring and gentle cooling. The reaction mixture was heated to 220° C. over 3 h 30 min and kept at this temperature for 90 min. The low-boiling components,

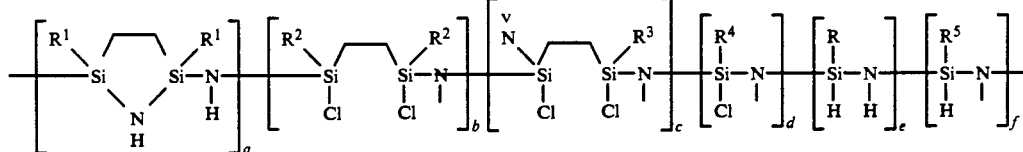

CH₃SiHCl₂ and CH₃SiH₂Cl (154 g), were found in the cold trap. After cooling, the reaction mixture was dissolved in 400 ml of n-pentane and insoluble ammonium salts were separated off on a G4 frit. The pentane was then completely removed under reduced pressure and at elevated temperature to give a clear, slightly yellowish, transparent substance (210 g) after cooling.

¹H NMR data: SiH: δ=4.5–5.0 ppm (br) intensity: 1.2

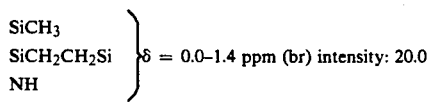 δ = 0.0–1.4 ppm (br) intensity: 20.0

Analytical data: found: Si 38.8%, N 14.4%, Cl 17.6%, 0 <0.3%; calculated: Si 37.3%, N 18.7%, Cl 12.2%, C 25.2% H 6.6%.

The polymer has formula (III) where R=R¹=R⁴=R⁵=CH₃ and the indices have the following values: a=0.4, d=0.36, e=0.14, f=0.1; b=c=0:

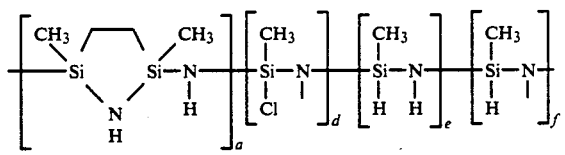

What is claimed is:

1. A process for the preparation of polymeric chlorosilazanes which comprises reactng a mixture of oligosilazanes of general formula (I)

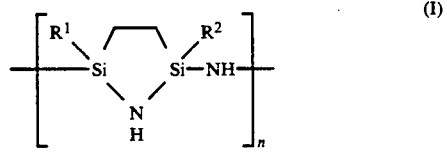 (I)

in which n is about 2 to about 12, and oligosilazanes of formula (II), (RSiHNH)ₘ, in which m is about 3 to about 12, with at least one of the chlorosilanes Cl₂R²Si—CH₂—CH₂—SiR²Cl₂, Cl₃Si—CH₂—CH₂—SiR³Cl₂, R⁴SiCl₃ or R⁵SiHCl₂ at 30° C. to 300° C., where R and R¹ to R⁵ are C₂–C₆ alkyl or C₂–C₆ alkenyl groups which can be identical or different.

2. A process as claimed in claim 1, wherein R and R¹ to R⁵ are C₁–C₃ alkyl or C₂–C₃ alkenyl groups.

3. A process as claimed in claim 1, wherein R=R¹=R²=R³=R⁵=CH₃ and R⁴=CH₃ or vinyl.

4. A process as claimed in claim 1, wherein the molar ration of the chlorosilanes to the monomer units of the oligosilazanes is about 0.1:1 to 1:1.

5. A process as claimed in claim 1, wherein the temperature is kept at 30° C. to 50° C. when the reactants are brought together and the reaction mixture is then heated to temperatures of 100° C. to 300° C.

6. A polymeric chlorosilazane of formula (III)

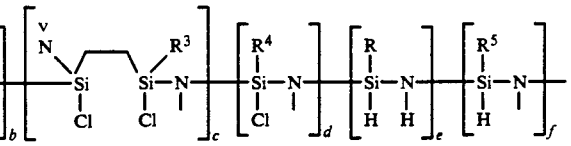

where the free valencies of the nitrogen atoms are saturated with H atoms or silyl radicals R*SiXN< (X=H, Cl, N<, CH₂Ch₂Si=) and where R, R¹ to R⁵ and R* are C₁–C₆ alkyl or C₂–C₆ alkenyl groups and a, b, c, d, e and f are the mol fractions of the respective structural units wherein the sum of a+b+c+d+e+f=1, the sum of a+e is in the range of 0.1 to 0.8, and the individual values of b, c, d and f range from 0 to 0.4.

7. A polymeric chlorosilazane as claimed in claim 6, wherein R, R¹ to R⁵ and R* are C₁–C₃ alkyl or C₂–C₃ alkenyl groups.

8. A polymeric chlorosilazane as claimed in claim 6, wherein R=R¹=R²=R³=R⁵=R*=CH₃ and R⁴=CH₃ or vinyl.

9. A polymeric chlorosilazane which can be obtained by the process as claimed in claim 1.

* * * * *